US012671331B2

(12) United States Patent
Matsumura et al.

(10) Patent No.: US 12,671,331 B2
(45) Date of Patent: Jun. 30, 2026

(54) POWER CONVERTER

(71) Applicants: NEXPERIA B.V., Nijmegen (NL); Nexperia Technology (Shanghai) Ltd., Shanghai (CN)

(72) Inventors: Yasuo Matsumura, Osaka (JP); Katsuya Goto, Oita (JP)

(73) Assignees: Nexperia B.V., Nijmegen (NL); Nexperia Technology (Shanghai) Ltd., Shanghai (CN)

( * ) Notice: Subject to any disclaimer, the term of this patent is extended or adjusted under 35 U.S.C. 154(b) by 406 days.

(21) Appl. No.: 18/514,390

(22) Filed: Nov. 20, 2023

(65) Prior Publication Data

US 2024/0178754 A1 May 30, 2024

(30) Foreign Application Priority Data

Nov. 24, 2022 (EP) .................................... 22209467

(51) Int. Cl.
H02M 3/157 (2006.01)
H02M 3/158 (2006.01)

(52) U.S. Cl.
CPC ........... H02M 3/157 (2013.01); H02M 3/158 (2013.01)

(58) Field of Classification Search
CPC .... H02M 3/157; H02M 3/158; H02M 3/1582; H02M 3/1586; H02M 3/155; H02M 3/156; H02M 3/1566
See application file for complete search history.

(56) References Cited

U.S. PATENT DOCUMENTS

| | | | |
|---|---|---|---|
| 9,124,177 B2 | 9/2015 | Zhu et al. | |
| 11,456,668 B2 | 9/2022 | Lalithambika et al. | |
| 2008/0315850 A1* | 12/2008 | Nishida ................. | H02M 3/157 323/284 |
| 2015/0137776 A1 | 5/2015 | Thomas et al. | |
| 2015/0280557 A1* | 10/2015 | Xue ...................... | H02M 3/156 323/271 |

* cited by examiner

*Primary Examiner* — Nguyen Tran

(74) *Attorney, Agent, or Firm* — Ruggiero McAllister & McMahon LLC

(57) ABSTRACT

The present disclosure relates to a power converter and to a buck DC-to-DC power converter, such as a constant-on-time (COT) Buck DC-to-DC power converter. Additionally, a COT Buck DC-to-DC converter is provided which has a seamless transition between the normal operation mode and the 100% duty operation mode.

18 Claims, 11 Drawing Sheets

(a)                    (b)

POWER CONVERTER

CROSS-REFERENCE TO RELATED APPLICATIONS

This application claims the benefit under 35 U.S.C. § 119(a) of European Application No. 22209467.4 filed Nov. 24, 2022, the contents of which are incorporated by reference herein in their entirety.

BACKGROUND

1. Field of the Disclosure

The present disclosure relates to a power converter. More particularly, but not exclusively, the present disclosure relates to a buck DC-to-DC power converter, such as a constant-on-time (COT) Buck DC-to-DC power converter.

2. Description of the Related Art

A DC-to-DC converter converts a direct current (DC) power source from one voltage level to another. A DC-to-DC converter may be, for example, a Buck DC-to-DC converter in which the input voltage is higher than the output voltage, a Boost DC-to-DC converter in which the input voltage is lower than the output voltage, or a Buck-Boost DC-to-DC converter in which the input voltage is higher or lower than the output voltage.

In a COT power converter, such as a Buck DC-to-DC converter, a Boost DC-to-DC converter, or a Buck-Boost DC-to-DC converter, a part of the output voltage of the DC-to-DC converter can be fed back to form a regulation loop. It is known that a COT Buck DC-to-DC converter may operate in a normal operation mode, and a 100% duty operation mode. During the normal operation mode, power switches within the converter are controlled on and off periodically by a chopping signal, such that the output voltage is lower than the input voltage. During the 100% duty operation mode, a high side power switch remains at on state and a low side power switch remains at off state, such that the output voltage is substantially equal to the input voltage. However, during the transition between the normal operation mode and the 100% duty operation mode (e.g., when the input voltage drops close to the output voltage), the output voltage generally experiences a large fluctuation. The fluctuation may be at a level of hundreds of millivolts (mV). Due to the fluctuation, the output voltage may fail to meet the accuracy specification in some applications.

Thus, there is a need to provide a COT Buck DC-to-DC converter which has a seamless transition between the normal operation mode and the 100% duty operation mode.

It is an object of the present disclosure, among others, to provide such a power converter.

U.S. Pat. No. 11,456,668 B2 discloses a method of operating a hysteretic synthetic current-mode switching regulator.

US 2015/0137776 A1 discloses a DC-DC converter which transitions between a continuous conduction mode (CCM) and discontinuous conduction mode (DCM) without causing any overshoot or undershoot deviation output voltage.

U.S. Pat. No. 9,124,177 B2 discloses systems and devices for smooth light load operation in a DC/DC converter.

SUMMARY

According to a first aspect of the present disclosure, there is provided a power converter, comprising:

a switching circuit for converting an input voltage into an output voltage, comprising a high side switch, a low side switch, and a switching node between the high side switch and the low side switch;

a first comparator circuit configured to receive a reference voltage signal and a feedback voltage signal indicative of the output voltage, and to generate a first comparing signal based upon a comparison of the feedback voltage signal and the reference voltage signal;

a second comparator circuit configured to receive a ramp voltage signal based upon an integration of a phase signal from the switching node, and an emulated output voltage signal based upon the phase signal, and to generate a second comparing signal based upon a comparison of the ramp voltage signal and the emulated output voltage signal;

a mode control circuit configured to generate a state indication signal indicative of whether a ratio of the output voltage to the input voltage exceeds a predetermined threshold ratio; and a logic circuit configured to generate a switch control signal for controlling the switching circuit based upon the first comparing signal, the second comparing signal and the state indication signal, wherein the switch control signal is configured to cause the switching circuit to transition from a first operation mode to a second operation mode in response to a change of value of the state indication signal indicating that the ratio rises across the predetermined threshold ratio, and wherein the switch control signal is configured such that: during the first operation mode, an end of on-time of the high side switch in each switching cycle of the high side switch is determined by the second comparing signal, and during the second operation mode, an end of on-time of the high side switch in each switching cycle is determined by the first comparing signal.

It would be understood that the first operation mode takes place when the input voltage is significantly higher than the output voltage, and the second operation mode takes place when the input voltage drops close to the output voltage.

Advantageously, by configuring the switch control signal such that, during the second operation mode, an end of on-time of the high side switch in each switching cycle is determined by the first comparing signal (rather than the second comparing signal), the on-time of the high side switch in each switching cycle is extended as compared to the first operation mode. Accordingly, the on duty of the high side switch during the second operation mode may approach 100% without being restricted by a minimum off time of the high side switch. In this way, the drop of the output voltage with respect to the input voltage can be reduced, thereby allowing the output voltage to stay at a substantially flat level without experiencing significant fluctuations when the input voltage drops close to the output voltage.

It would be understood that an on/off state of the low side switch is always opposite to the on/off state of the high side switch.

The power converter may be a buck DC-to-DC power converter.

The power converter may further comprise an on-time generator circuit which comprises: an integrator circuit configured to generate the ramp voltage signal by integrating the phase signal from the switching node, a filter circuit configured to generate the emulated output voltage signal based upon the phase signal, and the second comparator circuit.

The switch control signal may be configured such that, during the second operation mode, an end of on-time of the high side switch in each switching cycle is determined by a change of value of the first comparing signal indicating that the feedback voltage signal rises across the reference voltage signal.

The switch control signal may be configured such that, during the second operation mode, an end of off-time of the high side switch in each switching cycle is determined by a pre-set delay time after the end of on-time of the high side switch.

In other words, after the end of on-time of the high side switch, the high side switch enters off-time and the off-time lasts for a duration equal to the pre-set delay time.

The switch control signal may be configured such that, during the first operation mode, an end of on-time of the high side switch in each switching cycle is determined by a change of value of the second comparing signal indicating that the ramp voltage signal rises across the emulated output voltage signal.

The switch control signal may be configured such that, during the first operation mode, an end of off-time of the high side switch in each switching cycle is determined by a change of value of the first comparing signal indicating that the feedback voltage signal falls across the reference voltage signal.

The logic circuit may comprise:
  a D flip-flop circuit configured to receive a D input signal, a clock input signal and a reset input signal and to generate a Q output signal, wherein the switch control signal is based upon the Q output signal;
  a clock circuit configured to generate the clock input signal based upon the first comparing signal and the switch control signal; and
  a reset circuit configured to generate the reset input signal based upon the first comparing signal, the second comparing signal and the state indication signal.

The D input signal may be a logic high voltage signal. The clock input signal may be configured to determine an end of off-time of the high side switch in each switching cycle of the high side switch. The reset input signal may be configured to determine an end of on-time of the high side switch in each switching cycle of the high side switch.

The switching circuit may comprise:
  an input node for coupling to the input voltage;
  an output node for providing the output voltage; wherein the high side switch is electrically coupled between the input node and the switching node, the low side switch is electrically coupled between the switching node and a ground node, and an inductor electrically coupled between the switching node and the output node for providing an inductor current to the output node under control of the high side and low side switches in response to the switch control signal.

The mode control circuit may comprise a third comparator circuit configured to receive a sampled output voltage signal and a voltage signal indicative of the input voltage, and to generate the state indication signal based upon a comparison of the sampled output voltage signal and the voltage signal indicative of the input voltage.

The sampled output voltage signal may be proportional to the output voltage. The voltage signal indicative of the input voltage may be proportional to the input voltage.

The mode control circuit may comprise a voltage divider circuit configured to generate the voltage signal indicative of the input voltage. A further voltage divider circuit may be used to generate the sampled output voltage signal based upon the output voltage.

Alternatively, the mode control circuit may comprise a fourth comparator circuit configured to receive a signal indicative of the ramp voltage signal and a voltage signal indicative of the input voltage, and to generate the state indication signal based upon a comparison of the signal indicative of the ramp voltage signal and the voltage signal indicative of the input voltage.

The signal indicative of the ramp voltage signal may be substantially identical to the ramp voltage signal. The mode control circuit may comprise a further integrator circuit configured to generate the signal indicative of the ramp voltage signal by integrating the phase signal from the switching node.

The power converter may further comprise:
  a voltage sensing circuit configured to generate a sampled output voltage signal based upon the output voltage;
  an operational amplifier, op-amp, for compensating a DC offset between the sampled output voltage signal and the reference voltage signal, wherein the op-amp is configured to receive the sampled output voltage signal and the reference voltage signal and to generate a compensated sampled output voltage signal;
  a ripple injection generator circuit configured to generate a rippled voltage signal based upon the phase from the switching node; and
  a summation circuit configured to generate the feedback voltage signal indicative of the output voltage based upon a summation of the compensated sampled output voltage signal and the rippled voltage signal.

The voltage sensing circuit may be a voltage divider circuit. The sampled output voltage signal may be a fraction of the output voltage.

It would be appreciated that the operational amplifier may be omitted such that the summation circuit generates the feedback voltage signal indicative of the output voltage based upon a summation of the sampled output voltage signal and the rippled voltage signal.

The logic circuit may be further configured to determine whether the on-time of the high side switch in a switching cycle exceeds a predetermined threshold period, and if so, to generate the switch control signal so as to cause the switching circuit to transition from the second operation mode to a third operation mode, during which the high side switch remains at constant on state and the low side switch remains at constant off state.

The power converter may further comprise a second mode control circuit configured to generate a second state indication signal by determine whether a sampled output voltage signal exceeds the reference voltage signal. The logic circuit may be configured to generate the switch control signal further based upon the second state indication signal. The switch control signal may be configured to cause the switching circuit to transition from the third operation mode to the second operation mode in response to a change of value of the second state indication signal indicating that the sampled output voltage signal rises across the reference voltage signal.

A voltage divider circuit may be used to generate the sampled output voltage signal based upon the output voltage.

The first, second and third operation modes of the switching circuit may also be referred to as a normal operation mode, an extended on-time operation mode, and a 100% duty operation mode, respectively.

According to a second aspect of the present disclosure, there is provided a controller for a switching circuit, wherein the switching circuit is for converting an input voltage into an output voltage, and comprises a high side switch, a low side switch, and a switching node between the high side switch and the low side switch, the controller comprising:

a first comparator circuit configured to receive a reference voltage signal and a feedback voltage signal indicative of the output voltage, and to generate a first comparing signal based upon a comparison of the feedback voltage signal and the reference voltage signal;

a second comparator circuit configured to receive a ramp voltage signal based upon an integration of a phase signal from the switching node, and an emulated output voltage signal based upon the phase signal, and to generate a second comparing signal based upon a comparison of the ramp voltage signal and the emulated output voltage signal;

a mode control circuit configured to generate a state indication signal indicative of whether a ratio of the output voltage to the input voltage exceeds a predetermined threshold ratio; and a logic circuit configured to generate a switch control signal for controlling the switching circuit based upon the first comparing signal, the second comparing signal and the state indication signal, wherein the switch control signal is configured to cause the switching circuit to transition from a first operation mode to a second operation mode in response to a change of value of the state indication signal indicating that the ratio rises across the predetermined threshold ratio, and wherein the switch control signal is configured such that: during the first operation mode, an end of on-time of the high side switch in each switching cycle of the high side switch is determined by the second comparing signal, and during the second operation mode, an end of on-time of the high side switch in each switching cycle is determined by the first comparing signal.

According to a third aspect of the present disclosure, there is provided a method for controlling a switching circuit, wherein the switching circuit is for converting an input voltage into an output voltage, and comprises a high side switch, a low side switch, and a switching node between the high side switch and the low side switch, the method comprising:

generating a first comparing signal by comparing a feedback voltage signal indicative of the output voltage with a reference voltage signal;

generating a second comparing signal by comparing a ramp voltage signal based upon an integration of a phase signal from the switching node with an emulated output voltage signal based upon the phase signal; and generating a state indication signal indicative of whether a ratio of the output voltage to the input voltage exceeds a predetermined threshold ratio; and generating a switch control signal for controlling the switching circuit based upon the first comparing signal, the second comparing signal and the state indication signal, wherein the switch control signal is configured to cause the switching circuit to transition from a first operation mode to a second operation mode in response to a change of value of the state indication signal indicating that the ratio rises across the predetermined threshold ratio, and wherein the switch control signal is configured such that: during the first operation mode, an end of on-time of the high side switch in each switching cycle of the high side switch is determined by the second comparing signal, and during the second operation mode, an end of on-time of the high side switch in each switching cycle is determined by the first comparing signal.

The term "electrically coupled" used in the present disclosure includes that one or more intervening element(s) adapted for electrical conduction may exist between the electrically coupled elements.

It would also be understood that the terms "first", "second" and "third" are simply used in the present disclosure to label the relevant elements ("comparator circuit", "comparing signal", "operation mode", "mode control circuit" etc.) for the ease of description, and do not imply any limitations to the sequence, location or the total number of the relevant elements.

Where appropriate any of the optional features described above in relation to one of the aspects of the present disclosure may be applied to another one of the aspects of the disclosure.

BRIEF DESCRIPTION OF DRAWINGS

Features described above with reference to one aspect of the invention may be combined with other aspects of the invention.

Embodiments of the invention will now be described, by way of example only, with reference to the accompanying drawings in which:

Figure 1:
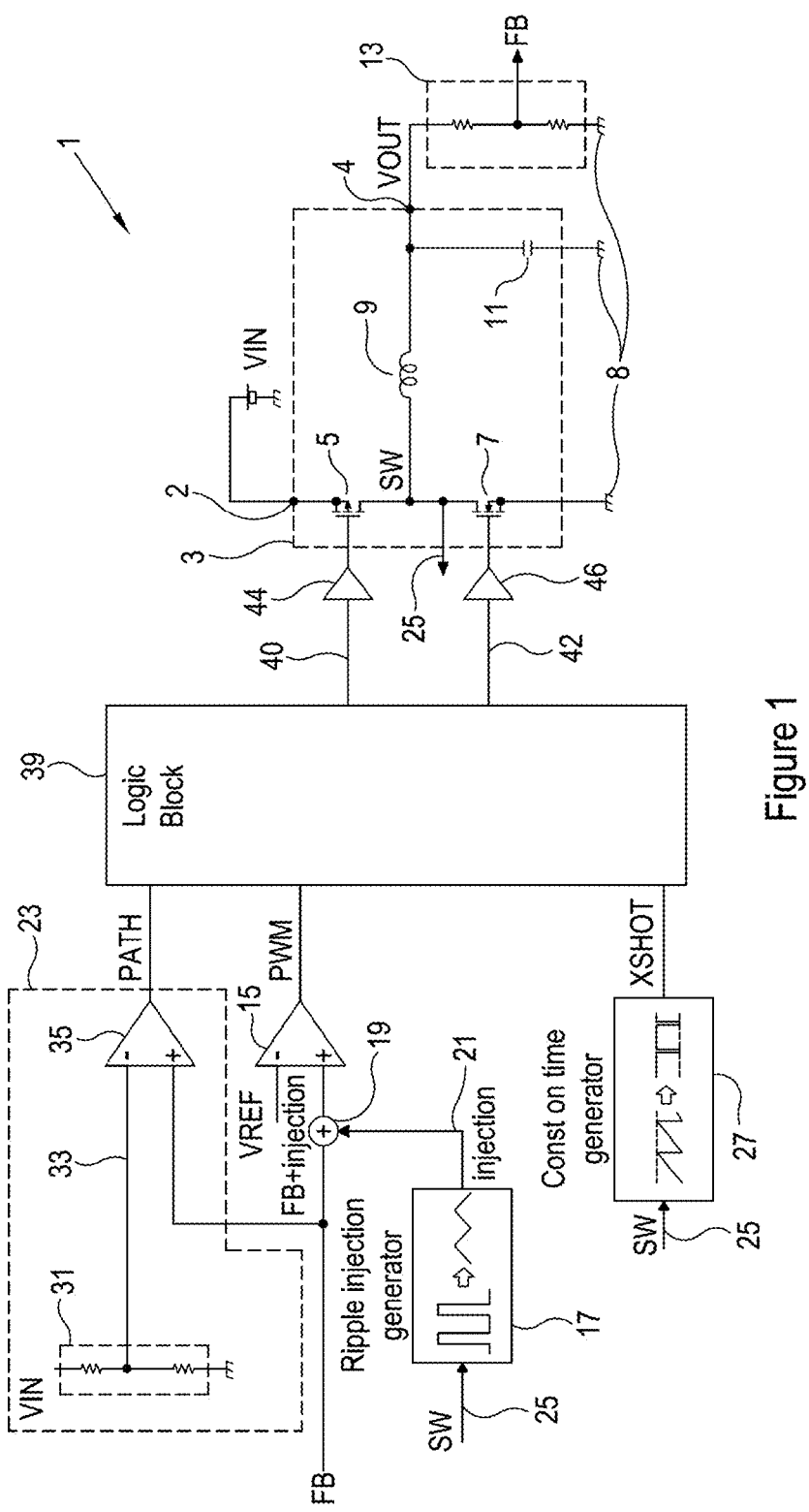

In order that the disclosure may be more fully understood, a number of embodiments of the disclosure will now be described, by way of example, with reference to the accompanying drawings, in which:

FIG. 1 is a schematic diagram of a power converter according to an aspect of the present disclosure.

Figure 2:
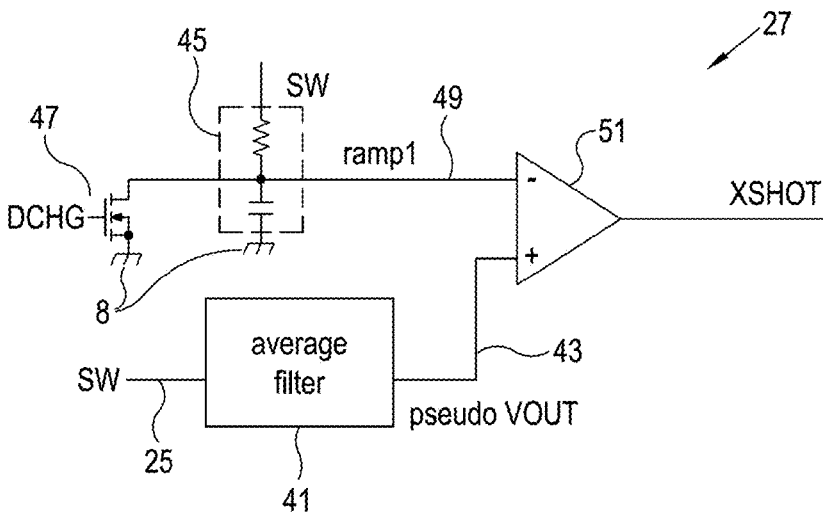

FIG. 2 is a schematic diagram of a COT generator within the power converter of FIG. 1.

Figure 3:
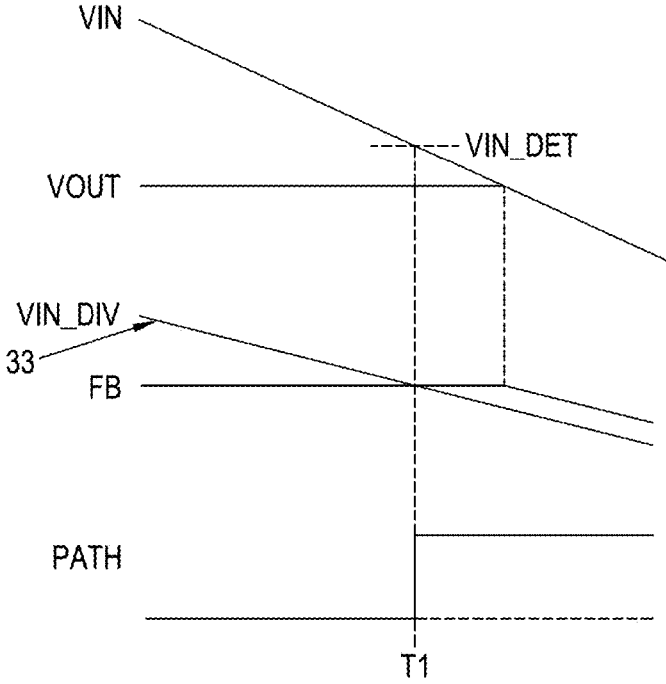

FIG. 3 schematically illustrates waveforms of a mode control circuit within the power converter of FIG. 1.

Figure 4:
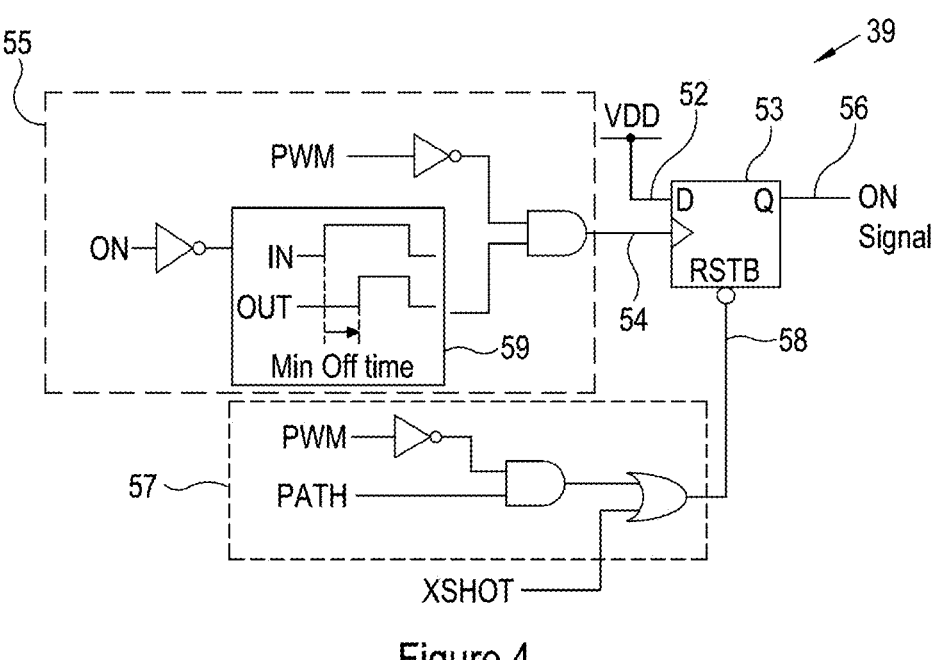

FIG. 4 is a schematic diagram of part of a logic circuit within the power converter of FIG. 1.

Figure 5:
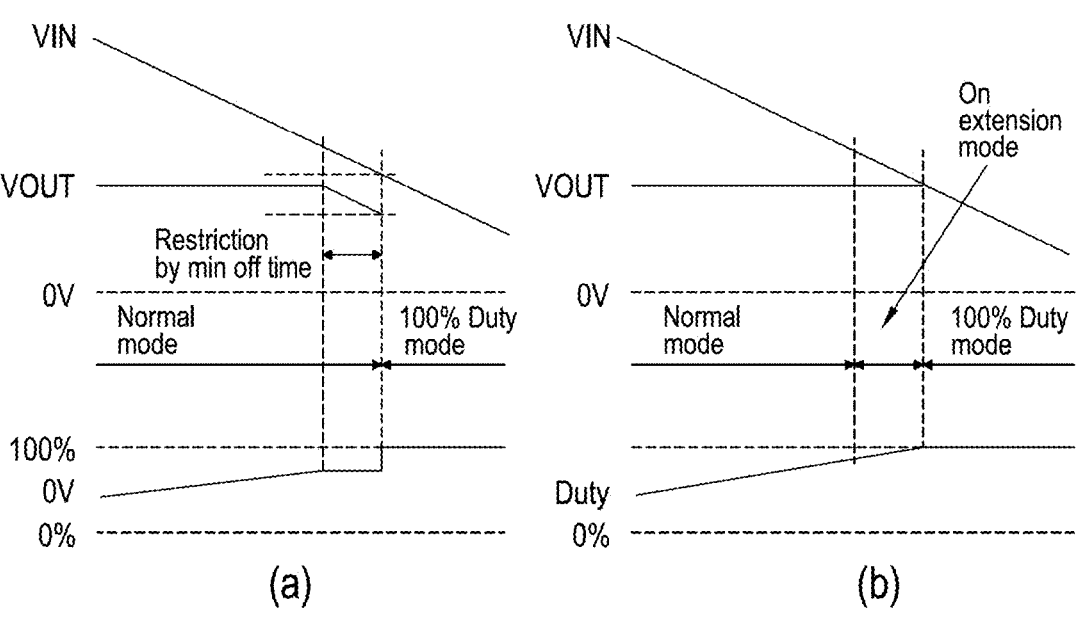

FIG. 5 schematically illustrates waveforms of (a) a conventional power converter; and (b) the power converter of FIG. 1.

Figure 6:
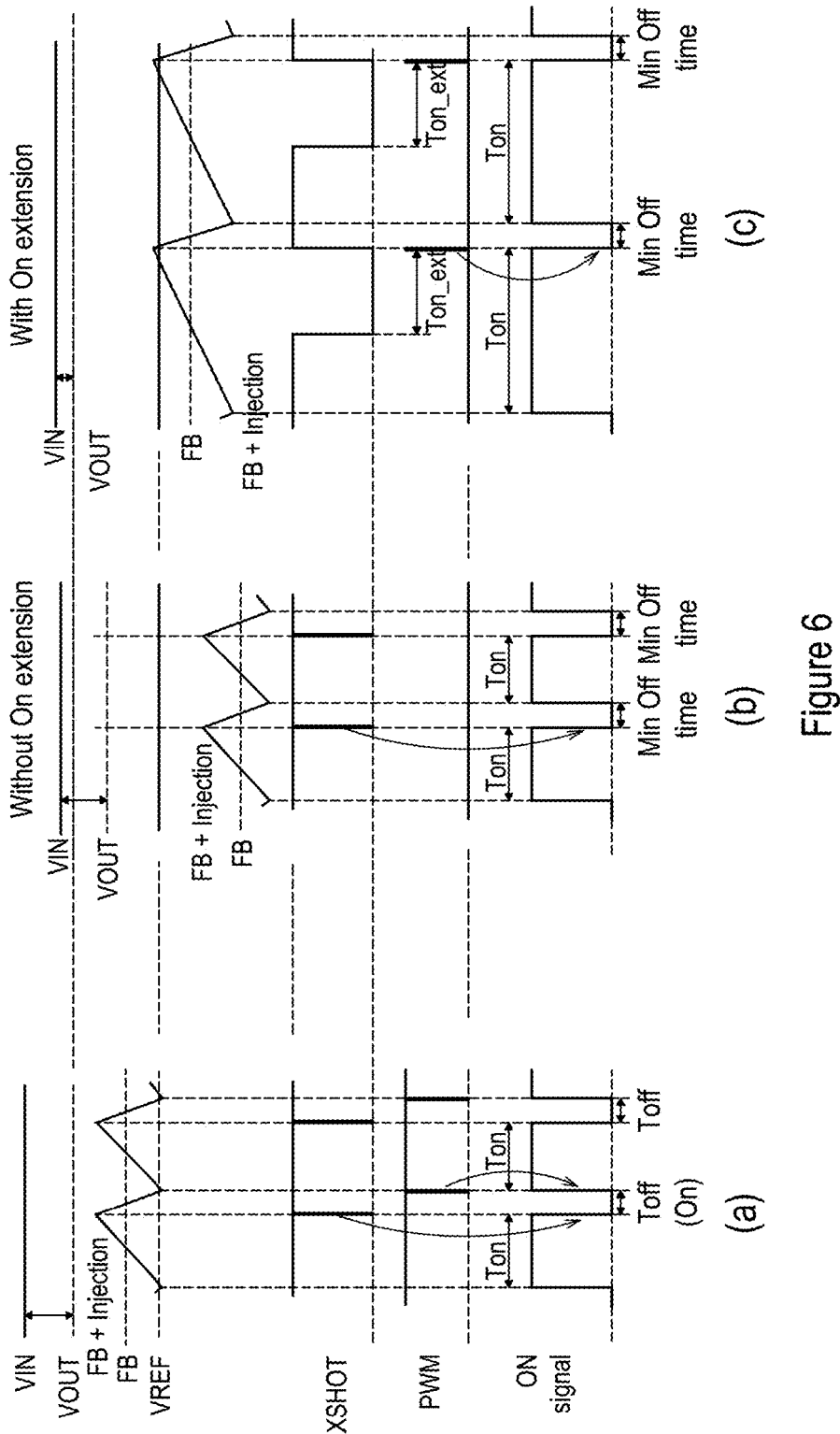

FIG. 6 schematically illustrates waveforms of (a) the power converter of FIG. 1 during a normal operation mode; (b) a conventional power converter when the input voltage drops close to the output voltage; and (c) the power converter of FIG. 1 when the input voltage drops close to the output voltage (i.e., during an extended on-time operation mode).

Figure 7:
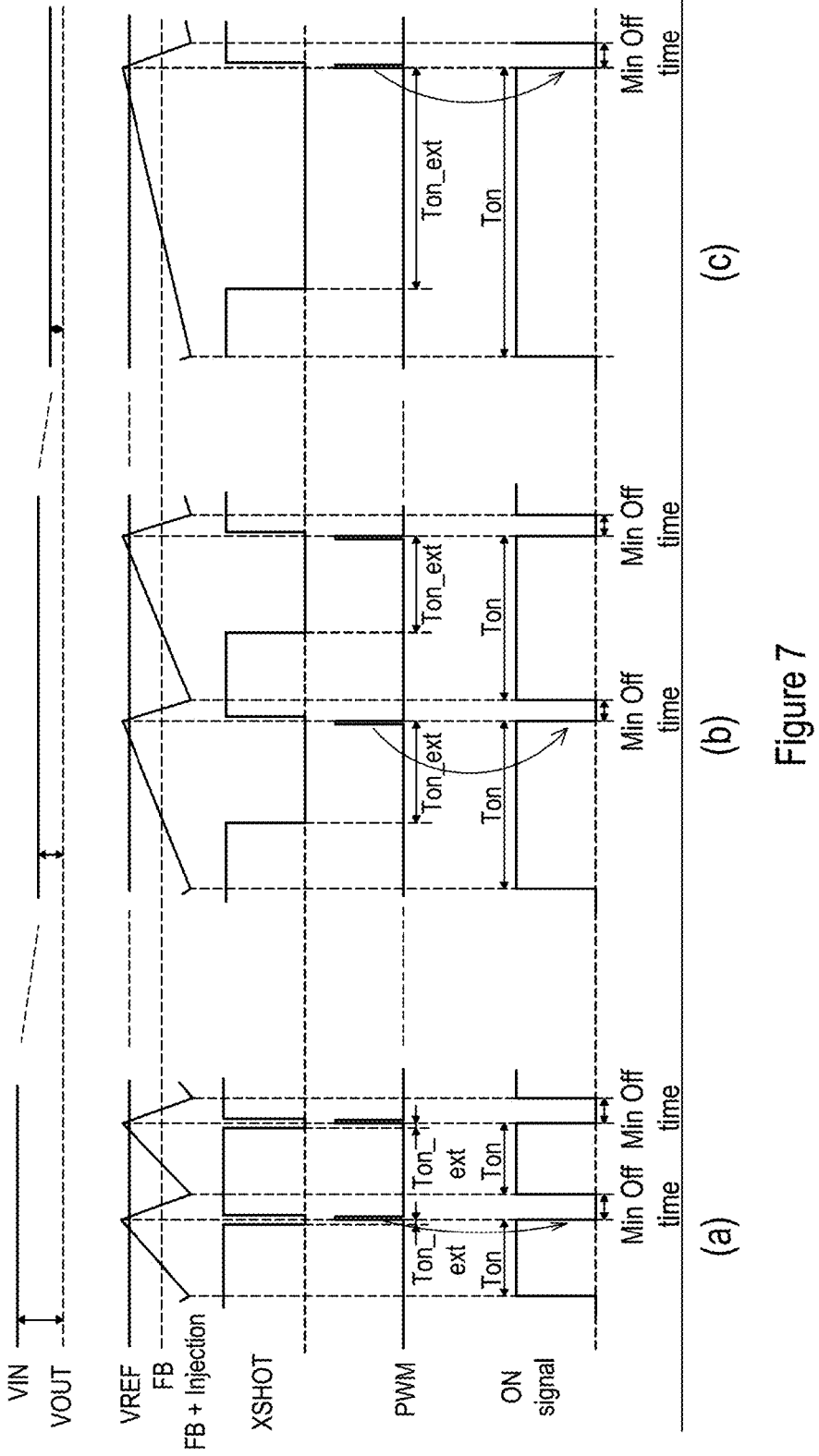

FIG. 7 schematically illustrates waveforms of the power converter of FIG. 1 during the extended on-time operation mode.

Figure 8:
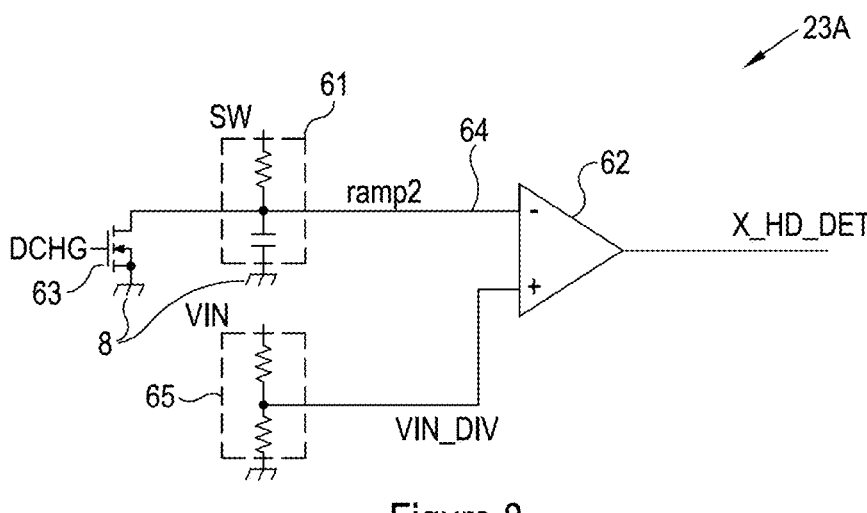

FIG. 8 a schematic diagram of an alternative mode control circuit that can be used in the power converter of FIG. 1.

Figure 9:
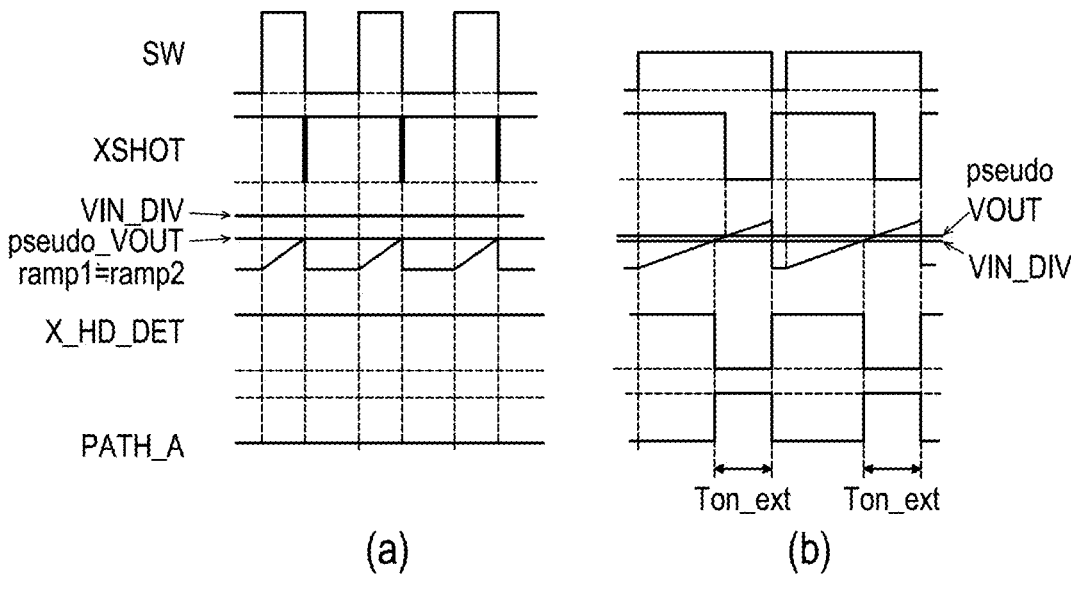

FIG. 9 schematically illustrates waveforms of the alternative mode control circuit of FIG. 8.

Figure 10:
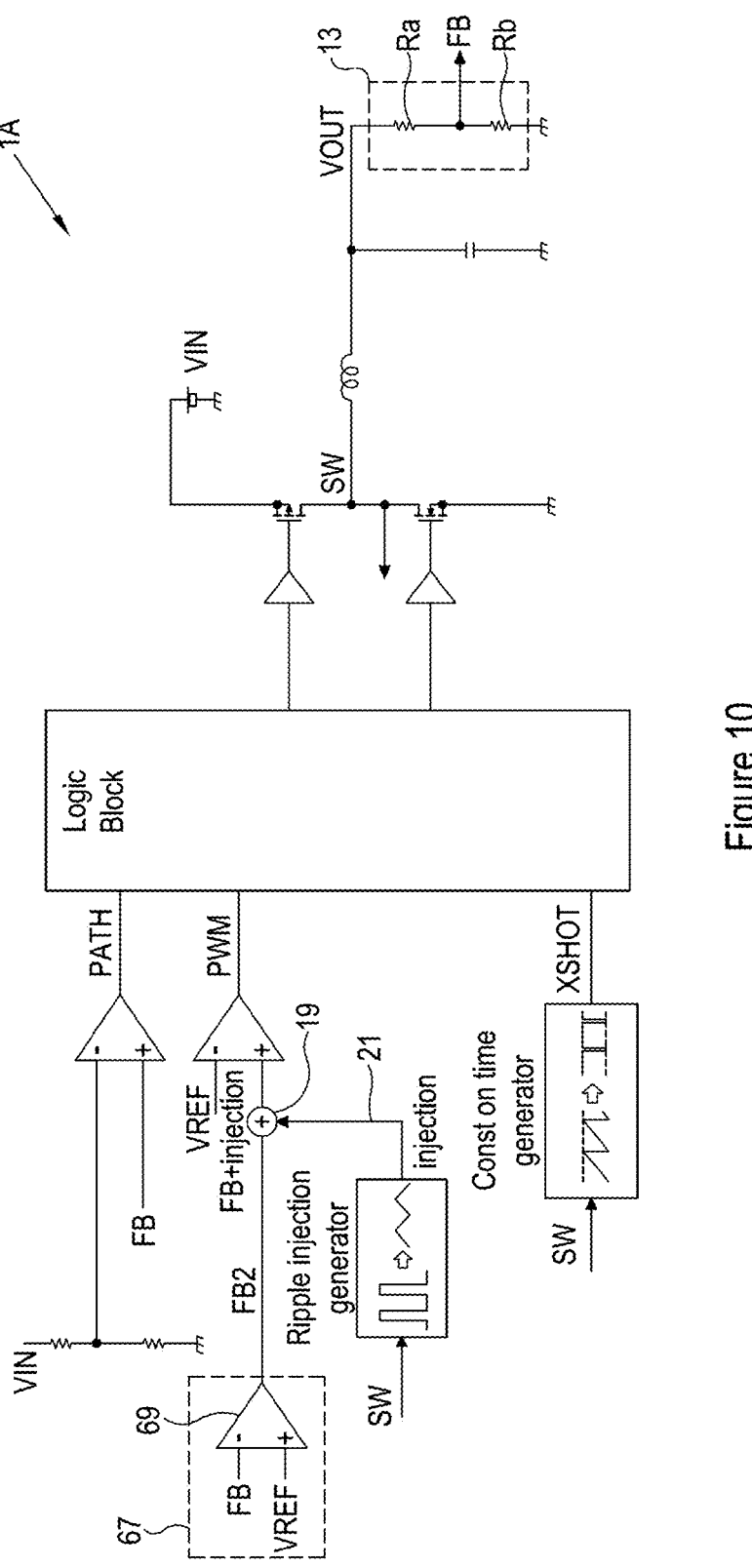

FIG. 10 is a schematic diagram of a power converter according to another aspect of the present disclosure.

Figure 11:
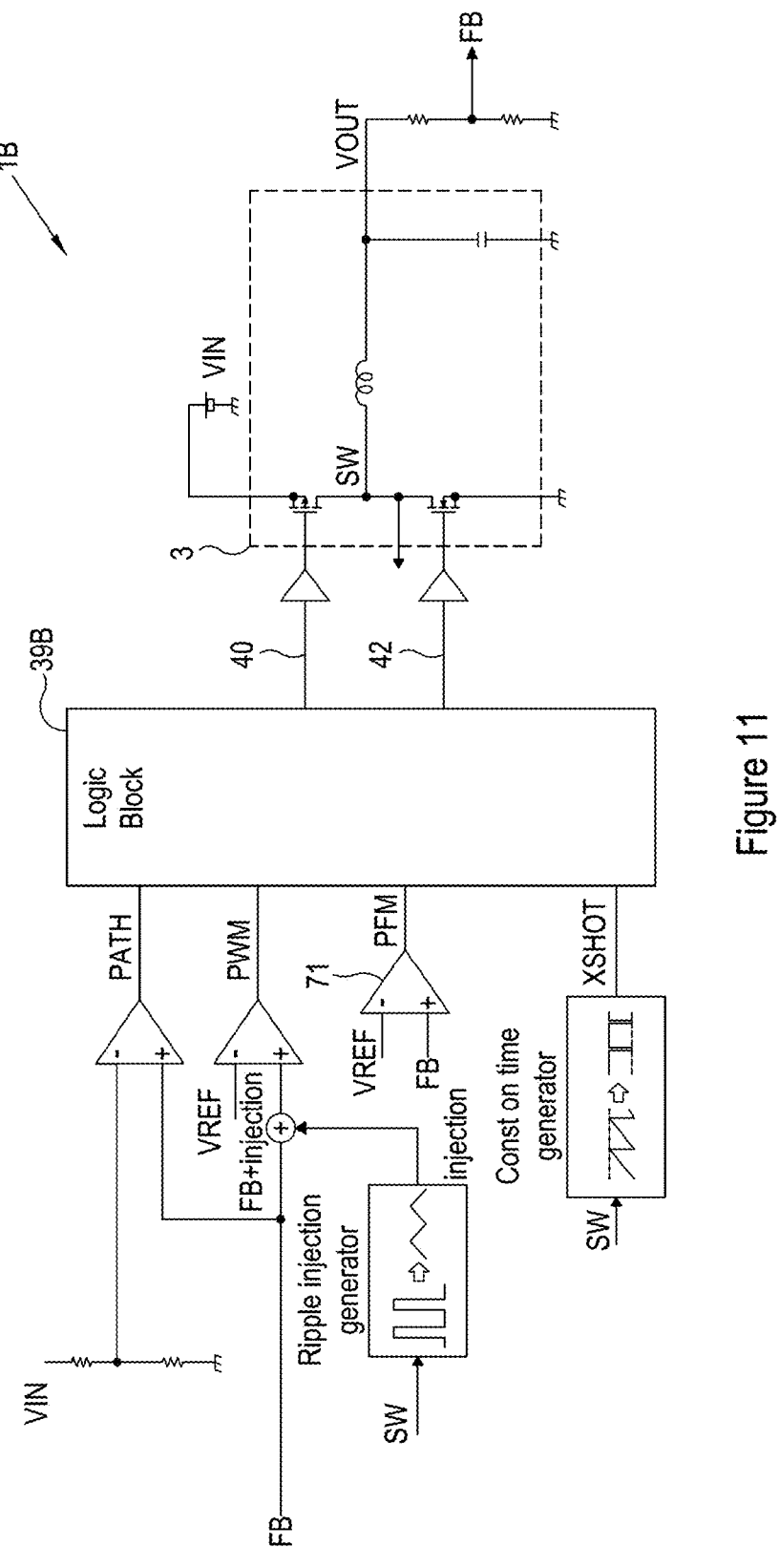

FIG. 11 is a schematic diagram of a power converter according to a further aspect of the present disclosure.

Figure 12:
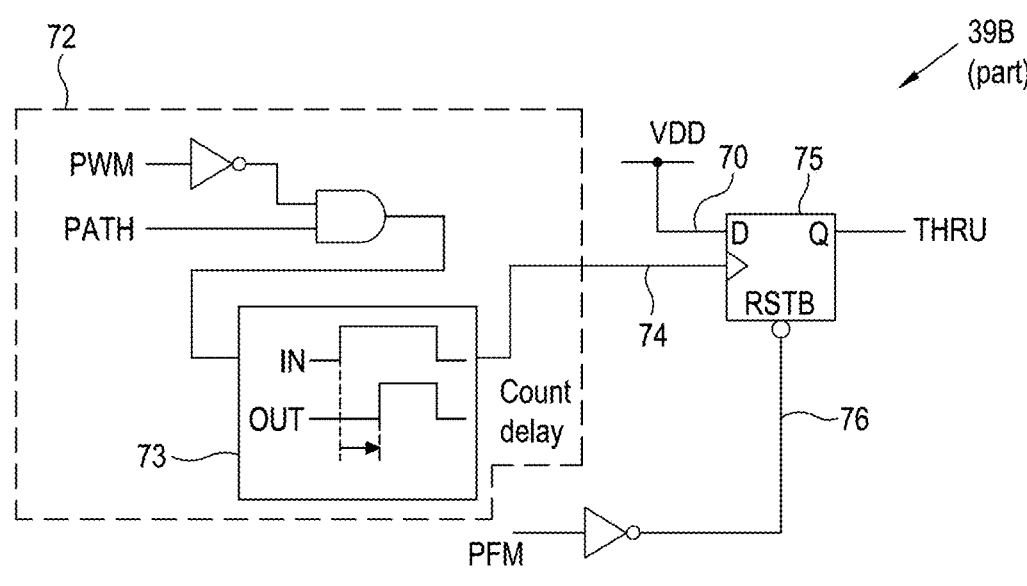

FIG. 12 is a schematic diagram of part of a logic circuit within the power converter of FIG. 11.

Figure 13:
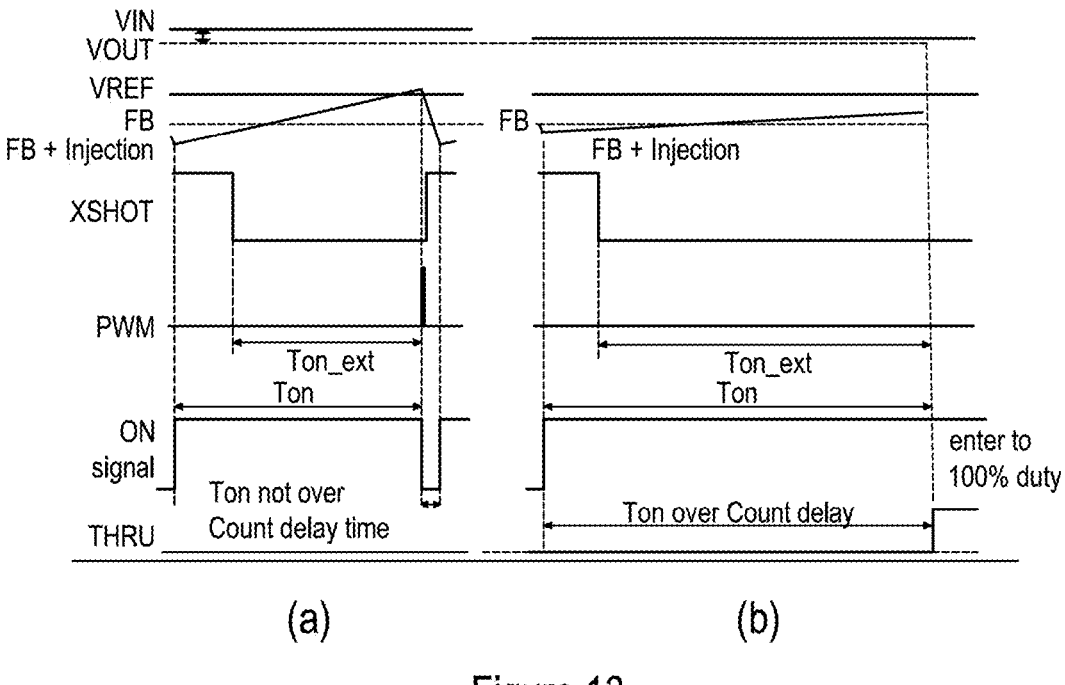

FIG. 13 schematically illustrates waveforms of the power converter of FIG. 11 when the power converter transitions from the extended on-time operation mode to a 100% duty operation mode.

Figure 14:
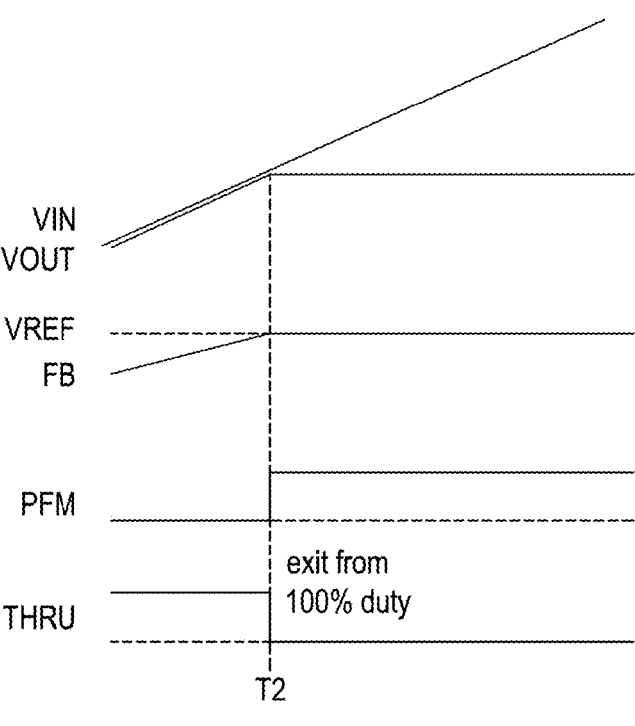

FIG. 14 schematically illustrates waveforms of the power converter of FIG. 11 when the power converter transitions from the 100% duty operation mode to the extended on-time operation mode.

Figure 15:
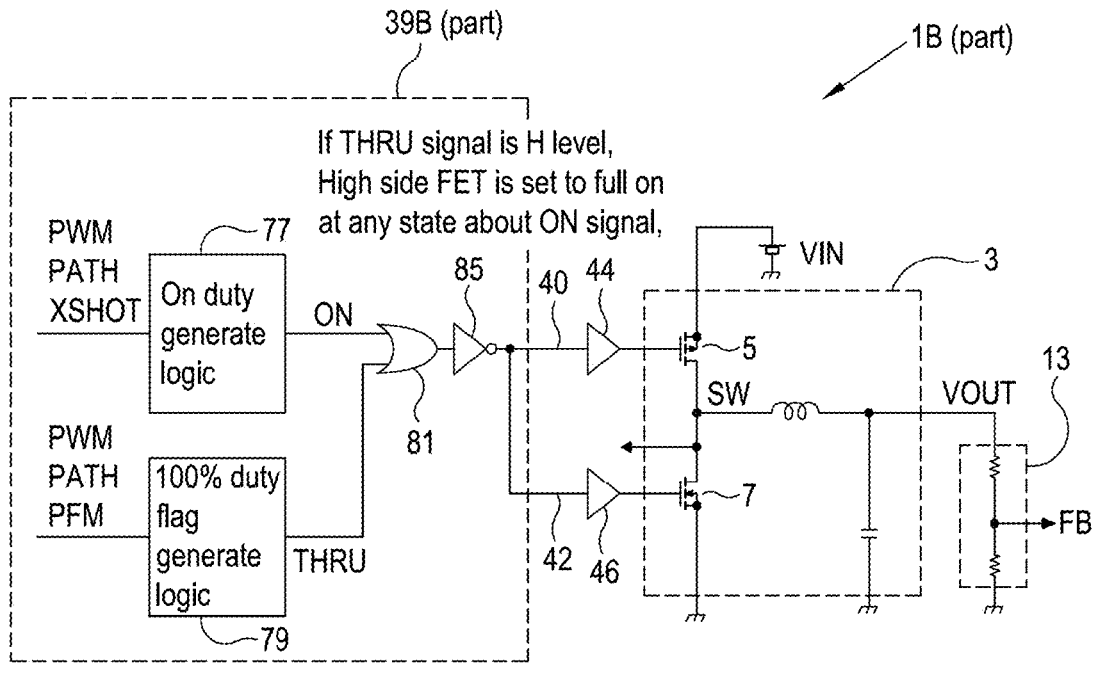

FIG. 15 is a schematic diagram of part of the logic circuit within the power converter of FIG. 11.

Figure 16:
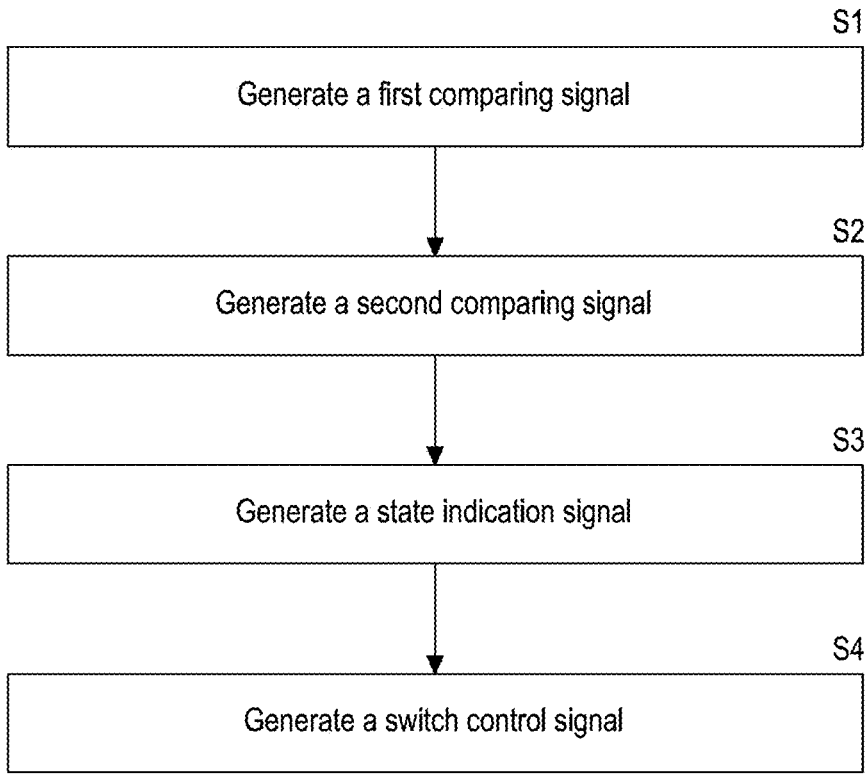

FIG. 16 schematically illustrates processing steps of a method for controlling a switching circuit.

In the figures, like parts are denoted by like reference numerals. It will be appreciated that the drawings are for illustration purposes only and are not drawn to scale.

DETAILED DESCRIPTION

FIG. 1 schematically illustrates a power converter 1 comprising a switching circuit 3, a voltage sensing circuit 13, a first comparator circuit 15, a ripple injection generator 17, a summation circuit 19, a mode control circuit 23, a COT generator (also referred to as "on-time generator circuit") 27, a logic block (also referred to as "logic circuit") 39 and driver circuits 44, 46. In the example of FIG. 1, the power converter 1 is embodied as a COT Buck DC-to-DC converter, and a sampled output voltage signal FB generated by the voltage sensing circuit 13 is provided to the first comparator circuit 15 to form a feedback loop.

The switching circuit 3 is for converting an input voltage VIN to an output voltage VOUT. The switching circuit 3 has a high side (HS) switch 5, a low side (LS) switch 7, an input node 2 for coupling to the input voltage VIN, an output node 4 for providing the output voltage VOUT, and a switching node SW between the HS switch 5 and the LS switch 7 for providing a phase signal 25. The HS switch 5 is electrically coupled between the input node 2 and the switching node SW, the LS switch 7 is electrically coupled between the switching node SW and a ground node 8. The switching circuit 3 further comprises an inductor 9 electrically coupled between the switching node SW and the output node 4 for providing an inductor current to the output node 4 under control of the HS switch 5 and the LS switch 7 in response to switch control signals 40, 42. The switching circuit 3 also has a DC-link capacitor 11 connected between the output node 4 and the ground node 8.

The voltage sensing circuit 13 is a voltage divider circuit and comprising a resistor chain. It generates the sampled output voltage signal FB, which is a fraction of the output voltage VOUT.

The ripple injection generator 17 generates a rippled voltage signal 21 (labelled as 'injection' in FIG. 1 which resembles a triangular wave) based upon the phase signal 25 from the switching node SW. The summation circuit 19 generates a voltage signal 'FB+injection' (also referred to as "feedback voltage signal indicative of the output voltage" below) based upon a summation of the sampled output voltage signal FB and the rippled voltage signal 21.

The first comparator circuit 15 receive a reference voltage signal VREF and the voltage signal 'FB+injection' and generates a PWM signal (also referred to as "a first comparing signal" below) as its output based upon a comparison of VREF and 'FB+injection'. The PWM signal is a digital signal having a logic high level and a logic low level.

The mode control circuit 23 has a voltage divider circuit 31 connected between the input voltage VIN and the ground node. The voltage divider circuit 31 generates a sampled input voltage signal 33 (also referred to as "a voltage signal indicative of the input voltage") which is a fraction of the input voltage VIN. The mode control circuit 23 also has a comparator circuit 35 (referred to as "a third comparator circuit" below) which receives the sampled output voltage signal FB and the sampled input voltage signal 33, and generates a PATH signal (also referred to as a "state indication signal") based upon a comparison of the FB signal and the signal 33. The PATH signal is a digital signal having a logic high level and a logic low level. FIG. 3 schematically illustrates waveforms of the mode control circuit 23. In FIG. 3, VIN_DIV represents the sampled input voltage signal 33. At time T1, the VIN_DIV signal falls across the FB signal, thereby generating a rising edge in the PATH signal. Because the comparator circuit 35 compares a fraction of the input voltage VIN with a fraction of the output voltage VOUT, the comparator circuit 35 essentially compares a ratio of the output voltage VOUT to the input voltage VIN with a predetermined threshold ratio. The predetermined threshold ratio is determined by the resistor values in the voltage divider circuits 13 and 31. By way of an example, the predetermined threshold ratio is 0.9.

The COT generator 27 receives the phase signal 25 from the switching node SW and generates an XSHOT signal (also referred to as a "second comparing signal" below). The XSHOT signal controls the on-time of the HS switch 5 in a normal operation mode. FIG. 2 schematically illustrate a circuit diagram of the COT generator 27. It includes an integrator circuit 45 connected between the switching node SW and the ground node 8. The integrator circuit 45 comprises a resistor and a capacitor, and therefore is an RC integrator. It integrates the phase signal 25 and generates a ramp voltage signal 49 ("ramp1") during on-time of the HS switch 5. A reset switch 47 is connected between a middle point of the RC integrator and the ground node 8. When the HS switch 5 is at on state, the reset switch is turned off. When the HS switch 5 is at off state, the reset switch 47 is turned on to pull the ramp voltage signal 49 to ground. The COT generator 27 further includes an average filter 41 (such as an RC filter) which is used to "smooth" the phase signal 25 (which is a chopping signal) to a relatively flat DC signal 43 ('Pseudo VOUT'). The signal 43 can be considered as an approximation of the output voltage VOUT. As such, the signal 43 may also be referred to as "an emulated output voltage signal". The COT generator 27 further includes a comparator circuit 51 (also referred to as "a second comparator circuit" below) which compares the ramp voltage signal 49 with the emulated output voltage signal 43 and generates the XSHOT signal in the output. The XSHOT signal is a digital signal having a logic high level and a logic low level.

The logic block 39 generates switch control signals 40, 42 for controlling the switching circuit 3 based upon the PWM signal, the XSHOT signal and the PATH signal. The switch control signals 40, 42 are fed to gates of the HS and LS switches 5, 7 via driver circuits 44, 46, respectively. In general, the HS and LS switches 5, 7 are not allowed to turn on at the same time, which would otherwise damage the switching circuit 3 due to the large current flowing from the input voltage VIN and the ground node 8. Therefore, up to one switch can be turned on at any single moment. The HS and LS switches 5, 7 typically have opposite on/off state. In the example of FIG. 1, the HS switch 5 is a PMOS transistor and the LS switch 5 is an NMOS transistor. Therefore, the switch control signals 40, 42 have the same logic level. It would be appreciated that the HS switch 5 may be replaced by an NMOS transistor, and in that case, the switch control signals 40, 42 would have opposite logic levels. Because switch control signals 40, 42 are logically associated with one another, the following discussion focuses upon the switch control signal 40 for the HS switch 5 for brevity.

The logic block 39 generates the switch control signals 40, 42 in a way such that the switch control signals 40, 42 control the switching circuit 3 to transition from the normal operation mode to an extended on-time operation mode in response to a rising edge of the PATH signal. In the example of FIG. 1, a rising edge of the PATH signal indicates that a ratio of the output voltage VOUT to the input voltage VIN rises across the predetermined threshold ratio. Therefore, the normal operation mode takes place when VIN is significantly higher than VOUT, and the extended on-time operation mode is triggered when VIN drops close to VOUT. This is described below in more detail with reference to FIG. 4 which shows an exemplary diagram of part of the logic block 39.

As shown in FIG. 4, the logic block 39 includes a D flip-flop circuit 53 which receive a D input signal 52 (connected to logic high), a clock input signal 54 and a reset input signal 58 and to generate a Q output signal 56. For simplicity, the Q output signal 56 is labelled as ON signal in the present disclosure. When the ON signal is '1' or logic high, it means that the HS switch 5 is at on state, and when the ON signal is '0' or logic low, it means that the HS switch 5 is at off state. It would be appreciated that the switch control signal 40 is related to the ON signal depending on whether the HS switch 5 is a PMOS transistor or an NMOS transistor. If the HS switch 5 is an NMOS transistor, the switch control signal 40 share the same logic level as the ON signal. If the HS switch 5 is a PMOS transistor, the switch control signal 40 always has an opposite logic level to the ON signal.

With further reference to FIG. 4, the logic block 39 includes a clock circuit 55 generating the clock input signal 54 based upon the ON signal and the PWM signal. The logic block 39 further includes a reset circuit 57 generating the reset input signal 58 based upon the PWM signal, the PATH signal and the XSHOT signal. The clock circuit 55 includes a delay counter 59 which generates a pre-set delay time 'Min Off time'.

For the D flip-flop circuit 53 as shown in FIG. 4, a rising edge of the clock input signal 54 causes the ON signal to transition from '0' to '1', and a falling edge of the reset input signal 58 resets the ON signal to '0'. Therefore, the clock input signal 54 determines an end of off-state (i.e., the start of the on-state) of the HS switch 5 in each of its switching cycles, and the reset input signal 58 determines an end of on-state (i.e., the start of off-state) of the HS switch 5 in each of its switching cycles.

When the PATH signal is '0' (i.e., the switching circuit 3 operates in the normal operation mode), the XSHOT signal determines the logic level of the reset input signal 58 in the exemplary circuit of FIG. 4. Thus, a falling edge of the XSHOT signal determines an end of on-time of the HS switch 5 in each switching cycle, as shown in FIG. 6(a). The on-time of the HS switch 5 in each switching cycle is labelled as 'Ton' in FIG. 6. In the example of FIG. 2, a falling edge of the XSHOT signal means that the ramp voltage signal 49 rises across the emulated output voltage signal 43. The output of the delay counter 59 and the NOT(PWM) are connected by an AND gate to generate the clock input signal 54. Therefore, a rising edge of the clock input signal 54 takes place when both of conditions (i) when the PWM signal becomes '0' and (ii) the 'Min Off time' expires after the latest falling edge of the ON signal (i.e., the end of on-time of the HS switch 5 in the same switching cycle) are met. During the normal operation mode, the falling edge of the PWM signal typically takes place later than the expiry of the 'Min Off time', and thus, as shown in FIG. 6(a), an end of off-time ('Toff') of the HS switch 5 in each switching cycle is determined by a falling edge of the PWM signal. It would be understood that when VIN drops to a lower potential, Toff also drops closer to the 'Min Off time'. With reference to FIG. 1, a falling edge of the PWM signal indicates that the feedback voltage signal 'FB+injection' falls across the reference voltage signal VREF.

When the PATH signal is '1' (i.e., the switching circuit 3 operates in the extended on-time operation mode), the waveforms of the PWM signal, the ON signal and the XSHOT signal according to the circuit of FIG. 4 are shown in FIG. 6(c). More specifically, an end of on-time ('Ton') of the HS switch 5 in each switching cycle is determined by a rising edge of the PWM signal (i.e., the feedback voltage signal 'FB+injection' rises across the reference voltage signal VREF). The off-time of the HS switch 5 in each switching cycle is equal to the pre-set delay time 'Min Off time' generated by the delay counter 59.

FIG. 6(b) shows the waveforms of the PWM signal, the ON signal and the XSHOT signal when VIN drops close to VOUT, if the mode control circuit 23 is not used (i.e., the XSHOT signal is directly connected to the reset input signal 58 in the logic block 39). It can be seen that a falling edge of the XSHOT signal determines an end of on-time ('Ton') of the HS switch 5 in each switching cycle, and the off-time of the HS switch 5 in each switching cycle is equal to the pre-set delay time 'Min Off time' generated by the delay counter 59.

By comparing FIG. 6(b) and FIG. 6(c), it is clear that the on-time ('Ton') of the HS switch 5 in each switching cycle of FIG. 6(c) is significantly longer than its counterpart in each switching cycle of FIG. 6(b). However, the off-time of the HS switch 5 remains the same between FIGS. 6(b) and 6(c). Therefore, the duty cycle of the ON signal has been extended by implementing the extended on-time operation mode, as compared to a conventional power converter without the extended on-time operation mode.

FIG. 7 shows waveforms of the signals during the extended on-time operation mode. The difference between VIN and VOUT decreases from FIG. 7(a) to FIG. 7(c). In each of FIG. 7(a) to FIG. 7(c), an end of on-time ('Ton') of the HS switch 5 in each switching cycle is determined by a rising edge of the PWM signal, and the off-time of the HS switch 5 in each switching cycle is equal to 'Min Off time'. It can be seen that the on-time Ton increases when VIN drops closer to VOUT. Therefore, during the extended on-time operation mode, the duty cycle of the ON signal keeps increasing when VIN keeps dropping towards VOUT and may approach 100%.

FIG. 5 compares the waveforms of VIN, VOUT and duty cycle of the ON signal between (a) a conventional power converter without the extended on-time operation mode, and (b) the power inverter 1 of the present disclosure. In the conventional power converter which only has a normal operation mode and a 100% duty cycle mode, the waveform of VOUT shows a significant fluctuation when VIN drops close to VOUT. This is because the duty cycle of the ON signal is restricted by the 'Min Off time'. The 'Min Off time' means a minimum off-time of the HS switch 5 in each switching cycle and is needed for low-side over current protection or boost strap generally. The 'Min Off time' is typically within a range of 20 ns to 100 ns. At a switching frequency of several hundred kHz, the influence of the 'Min Off time' is small, and when transitioning from the normal operation mode to the 100% duty operation mode, the drop in VOUT is negligible. However, at a switching frequency above 1 MHz, the 'Min Off time' has a significant effect on the duty cycle of the ON signal. It prevents the duty cycle from approaching 1, resulting in a drop in the VOUT voltage. Therefore, when shifting to the 100% duty operation mode, the VOUT voltage fluctuation is at a great level (e.g., several hundred mV). In contrast, in the power converter 1, when the VIN voltage drops close to the set VOUT voltage, an intermediate extended on-time operation mode between the normal operation mode and the 100% duty operation mode is triggered. During the extended on-time operation mode, the duty cycle of the ON signal can approach 100% by the extension of on-time and the fixed off-time, thereby reducing the drop of VOUT voltage. This causes a seamless transition with little VOUT fluctuation between the normal operation mode and the 100% duty operation mode. Conversely, when the VIN voltage increases above the set VOUT voltage, the transition from the 100% duty operation mode to the normal operation mode is also made via the extended on-time operation mode. Again, the transition is seamless with minimal voltage fluctuation in VOUT.

FIG. 8 shows a circuit diagram of an alternative mode control circuit 23A, which can be used to replace the mode control circuit 23 of FIG. 1. The mode control circuit 23A is useful when there is no pin for VOUT in some applications.

The mode control circuit 23A has a similar circuit structure to the COT generator 27. In particular, the mode control circuit 23A includes an integrator circuit 61 connected between the switching node SW and the ground node 8. The integrator circuit 61 comprises a resistor and a capacitor, and therefore is an RC integrator. It integrates the phase signal 25 and generates a ramp voltage signal 64 (labelled as "ramp2" in FIG. 8) during on-time of the HS switch 5. A reset switch 63 is connected between a middle point of the RC integrator and the ground node 8. When the HS switch 5 is at on state, the reset switch 63 is turned off. When the HS switch 5 is at off state, the reset switch 63 is turned on to pull the ramp voltage signal 64 to ground. The integrator circuit 61 and the reset switch 63 are designed to be identical to the integrator circuit 45 and the reset switch 47 of FIG. 2. Therefore, the 'ramp2' signal 64 has an identical waveform to the 'ramp1' signal 49 of FIG. 2.

The mode control circuit 23A further includes a voltage divider circuit 65 connected between the input voltage VIN and the ground node. The voltage divider circuit 65 generates a sampled input voltage signal 'VIN_DIV' (also referred to as "a voltage signal indicative of the input voltage" below) which is a fraction of the input voltage. By way of an example, VIN_DIV is 90% of the input voltage.

The mode control circuit 23A also has a comparator circuit 62 (also referred to as "a fourth comparator circuit" below) which compares the 'ramp2' signal 64 with the 'VIN_DIV' signal and generates an output signal 'X_HD_DET'. The X_HD_DET signal is a digital signal having a logic high level and a logic low level.

FIG. 9 shows waveforms of the mode control circuit 23A. FIG. 9(a) takes place during the normal operation mode. FIG. 9(b) shows how the extended on-time operation mode is triggered. The signal 'PATH_A' is an inverted version of the X_HD_DET signal and can be used to replace the PATH signal in FIG. 4.

More specially, when VIN_DIV falls below the 'Pseudo VOUT' signal 43 (e.g., as shown by FIG. 9(b)), the rising edge of the PATH_A signal occurs before the falling edge of the XSHOT signal. Therefore, the PATH_A signal prevents the falling edge of the XSHOT signal from resetting the ON signal with reference to the logic circuit 39 of FIG. 4 and the PWM waveform of FIG. 6(c). Consequently, it is the rising edge of the PWM signal that resets the ON signal and determines an end of on-time ('Ton') of the HS switch 5 in each switching cycle. This means that the switching circuit 3 operates in the extended on-time operation mode.

Conversely, when VIN_DIV stays slightly above the 'Pseudo VOUT' signal 43, the rising edge of the PATH_A signal (if any) occurs after the falling edge of the XSHOT signal. Therefore, with reference to the logic circuit 39 of FIG. 4, the falling edge of the XSHOT signal causes the ON signal to fall from '1' to '0', thereby determining an end of on-time of the HS switch 5 in each switching cycle. This means that the switching circuit 3 operates in the normal operation mode.

Therefore, the PATH_A signal (as compared to the timing of the XSHOT signal) indicates a comparison result of 'Pseudo VOUT' with VIN_DIV. Given that the 'Pseudo VOUT' signal 43 emulates VOUT, it can be said that the PATH_A signal indicates whether a ratio of VOUT to VIN exceeds a predetermined threshold ratio (e.g., 90%).

FIG. 10 schematically illustrates a power converter 1A according to a second embodiment of the present disclosure. Elements of the power converter 1A that are identical to those of the converter 1 are identified using the same labels. The features and advantages described above with reference to the first embodiment are generally applicable to the second embodiment.

The power converter 1A differs from the power converter 1 in that it further comprises an offset compensation circuit 67. The offset compensation circuit 67 includes an operational amplifier 69 which receives the sampled output voltage signal FB, and the reference voltage signal VREF, and generates a compensated sampled output voltage signal FB2. The compensated sampled output voltage signal FB2 is then superimposed on the rippled voltage signal 21 by the summation circuit 19. The purpose of the offset compensation circuit 67 is to compensate a DC offset between the sampled output voltage signal FB and the reference voltage signal VREF, so as to improve the accuracy of the VOUT voltage. This is because the accuracy of the VOUT voltage is associated with an offset between the VOUT voltage the VREF voltage, which is roughly equal to (the offset between FB and VREF)*(Ra+Rb)/Rb. Ra and Rb are resistors within the voltage sensing circuit 13 as shown in FIG. 10.

FIG. 11 schematically illustrates a power converter 1B according to a third embodiment of the present disclosure. Elements of the power converter 1B that are identical to those of the converter 1 are identified using the same labels. Elements of the power converter 1B that correspond to but are different from those of the converter 1 are identified using the same numbers but with a letter 'B' for differentiation. The features and advantages described above with reference to the first embodiment are generally applicable to the third embodiment.

The power converter 1B differs from the power inverter 1 in that it includes a second mode control circuit 71 which generates a flag signal PFM (also referred to as a "second mode indication signal" below) for signalling a transition from the 100% duty operation mode to the extended on-time operation mode.

As shown in FIG. 11, the second mode control circuit 71 is a comparator circuit. It compares the sampled output voltage signal FB with the reference voltage signal VREF. The PFM signal (which is a digital signal having logic high and logic low) is an output of the second mode control circuit 71 and indicates whether a sampled output voltage signal exceeds the reference voltage signal.

The logic circuit 39B of the power converter 1B includes extra logic for implementing the transition from the 100% duty operation mode to the extended on-time operation mode, and vice versa. The extra logic is shown in FIG. 12 and is in addition to the logic block shown in FIG. 4. In particular, the logic circuit 39B includes a further D flip-flop circuit 75 which receive a D input signal 70 (connected to logic high), a clock input signal 74 and a reset input signal 76 and to generate an output signal THRU. The logic block 39B generates the switch control signals 40, 42 in a way such that the switch control signals 40, 42 control the switching circuit 3 to transition from the extended on-time operation mode to the 100% duty operation mode in response to a rising edge of the THRU signal. Further, the switch control signals 40, 42 control the switching circuit 3 to transition from the 100% duty operation mode back to the extended on-time operation mode in response to a falling edge of the THRU signal.

With reference to FIG. 12, the logic circuit 39B includes a clock circuit 72 generating the clock input signal 74 based upon the PWM signal and the PATH signal. The clock circuit 72 includes a count delay circuit 73. Waveforms of the power converter 1B are shown in FIG. 13. The clock circuit 72 determines whether the on-time of the high side switch 5 in a switching cycle exceeds a predetermined threshold period set by the count delay circuit 73. If so, the clock input signal 74 rises from '0' to '1', which in turn causes the THRU signal to rise from '0' to '1', thereby triggering the transition from the extended on-time operation mode to the 100% duty operation mode.

FIG. 14 shows waveforms of the power converter 1B when the switching circuit 3 transitions from the 100% duty operation mode to the extended on-time operation mode. In particular, the transition is in response to a rising edge of the PFM signal at time T2, which causes a falling edge the reset input signal 76. As shown in FIG. 12, the falling edge of the reset input signal 76 resets the THRU signal to '0'. With reference to FIG. 11, a rising edge of the PFM signal indicates that the sampled output voltage signal FB rises across the reference voltage signal VREF.

FIG. 15 shows how the THRU signal is used within the logic circuit 39B to generate the switch control signals 40, 42. In FIG. 15, the ON duty generate logic 77 corresponds to the logic circuit shown in FIG. 4, the 100% duty flag generate logic 79 corresponds to the logic circuit shown in FIG. 12. When the THRU signal is '1', the switch control signals 40, 42 are '0' regardless of the logic of the ON signal (generated by FIG. 4). Therefore, the HS switch 5 (being a PMOS transistor in this example) remains on, and the LS switch 7 (being a NMOS transistor in this example) remains off. Accordingly, the switching circuit 3 operates in the 100% duty operation mode. When the THRU signal is '0', the switch control signals 40, 42 are controlled by the ON signal generated by the ON duty generate logic 77. This means that the switching circuit 3 operates in the normal operation mode or the extended on-time operation mode, as determined by the PATH signal.

FIG. 16 schematically illustrates processing steps of a method for controlling a switching circuit (e.g., the switching circuit 3). The switching circuit is for converting an input voltage (e.g., VIN) into an output voltage (e.g., VOUT), and comprises a high side switch (e.g., HS switch 5), a low side switch (e.g., LS switch 7), and a switching node (e.g., SW node) between the high side switch and the low side switch.

At step S1, a first comparing signal (e.g., the PWM signal) is generated, by comparing a feedback voltage signal (e.g., 'FB+injection' of FIG. 1 or 'FB2+injection' of FIG. 10) indicative of the output voltage with a reference voltage signal (e.g., VREF).

At step S2, a second comparing signal (e.g., XSHOT signal) is generated, by comparing a ramp voltage signal (e.g., ramp1 signal of FIG. 2) based upon an integration of a phase signal (e.g., the phase signal 25) from the switching node with an emulated output voltage signal (e.g., pseudo VOUT signal of FIG. 2) based upon the phase signal.

At step S3, a state indication signal (e.g., PATH signal or PATH_A signal) is generated. The state indication signal is indicative of whether a ratio of the output voltage to the input voltage exceeds a predetermined threshold ratio (e.g., 0.9).

At step S4, a switch control signal (e.g., the switch control signals 40, 42) for controlling the switching circuit is generated based upon the first comparing signal, the second comparing signal and the state indication signal. The switch control signal is configured to cause the switching circuit to transition from a first operation mode (e.g., a normal operation mode) to a second operation mode (e.g., an extended on-time operation mode) in response to a change of value of the state indication signal indicating that the ratio rises across the predetermined threshold ratio. The switch control signal is configured such that: during the first operation mode, an end of on-time of the high side switch in each switching cycle of the high side switch is determined by the second comparing signal, and during the second operation mode, an end of on-time of the high side switch in each switching cycle is determined by the first comparing signal.

It would be appreciated that the steps may be performed in a temporal order that is different from the order of description. For example, steps S1 to S3 may be performed simultaneously before step S4.

It would be appreciated that within the power converter 1, 1A or 1B, the circuit blocks except the switching circuit 3 may be considered as a controller for the switching circuit 3. The controller may be integrated in a single semiconductor chip, which is separate from the switching circuit 3. Alternatively, the entire power converter 1, 1A or 1B may be integrated in a single semiconductor chip.

The terms "having", "containing", "including", "comprising" and the like are open and the terms indicate the presence of stated structures, elements or features but not preclude the presence of additional elements or features. The articles "a", "an" and "the" are intended to include the plural as well as the singular, unless the context clearly indicates otherwise.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the disclosure, whether alone or in any appropriate combination with any other feature disclosed or illustrated herein.

What is claimed is:
1. A power converter, comprising:
a switching circuit configured to convert an input voltage into an output voltage, the switch circuit comprising a high side switch, a low side switch, and a switching node between the high side switch and the low side switch;

a first comparator circuit configured to receive a reference voltage signal and a feedback voltage signal indicative of the output voltage, the first comparator circuit configured to generate a first comparing signal based upon a comparison of the feedback voltage signal and the reference voltage signal;

a second comparator circuit configured to receive a ramp voltage signal based upon an integration of a phase signal from the switching node, and an emulated output voltage signal based upon the phase signal, the second comparator circuit configured to generate a second comparing signal based upon a comparison of the ramp voltage signal and the emulated output voltage signal;

a mode control circuit configured to generate a state indication signal indicative of whether a ratio of the output voltage to the input voltage exceeds a predetermined threshold ratio; and a logic circuit configured to generate a switch control signal to control the switching circuit based upon the first comparing signal, the second comparing signal and the state indication signal, wherein the switch control signal is configured to cause the switching circuit to transition from a first operation mode to a second operation mode in response to a change of value of the state indication signal indicating that the ratio rises across the predetermined threshold ratio, and wherein the switch control signal is configured so that during the first operation mode, an end of on-time of the high side switch in each switching cycle of the high side switch is determined by the second comparing signal, and during the second operation mode, an end of on-time of the high side switch in each switching cycle is determined by the first comparing signal.

2. The power converter according to claim 1, wherein the switch control signal is configured so that, during the second operation mode, an end of on-time of the high side switch in each switching cycle is determined by a change of value of the first comparing signal indicating that the feedback voltage signal rises across the reference voltage signal.

3. The power converter according to claim 1, wherein the switch control signal is configured so that, during the first operation mode, an end of on-time of the high side switch in each switching cycle is determined by a change of value of the second comparing signal indicating that the ramp voltage signal rises across the emulated output voltage signal.

4. The power converter according to claim 1, wherein the logic circuit further comprises:

a D flip-flop circuit configured to receive a D input signal, a clock input signal and a reset input signal, the D flip-flop configured to generate a Q output signal, wherein the switch control signal is based upon the Q output signal;

a clock circuit configured to generate the clock input signal based upon the first comparing signal and the switch control signal; and a reset circuit configured to generate the reset input signal based upon the first comparing signal, the second comparing signal and the state indication signal.

5. The power converter according to claim 1, wherein the switching circuit further comprises:

an input node for coupling to the input voltage;

an output node for providing the output voltage, wherein the high side switch is electrically coupled between the input node and the switching node, the low side switch is electrically coupled between the switching node and a ground node, and an inductor electrically coupled between the switching node and the output node for providing an inductor current to the output node under control of the high side and low side switches in response to the switch control signal.

6. The power converter according to claim 1, wherein the mode control circuit further comprises a third comparator circuit configured to receive a sampled output voltage signal and a voltage signal indicative of the input voltage, and wherein the third comparator circuit is configured to generate the state indication signal based upon a comparison of the sampled output voltage signal and the voltage signal indicative of the input voltage.

7. The power converter according to claim 1, wherein the mode control circuit further comprises a fourth comparator circuit configured to receive a signal indicative of the ramp voltage signal and a voltage signal indicative of the input voltage, and wherein the fourth comparator circuit is configured to generate the state indication signal based upon a comparison of the signal indicative of the ramp voltage signal and the voltage signal indicative of the input voltage.

8. The power converter according to claim 1, further comprising:

a voltage sensing circuit configured to generate a sampled output voltage signal based upon the output voltage;

an operational amplifier for compensating a DC offset between the sampled output voltage signal and the reference voltage signal, wherein the operational amplifier is configured to receive the sampled output voltage signal and the reference voltage signal and to generate a compensated sampled output voltage signal;

a ripple injection generator circuit configured to generate a rippled voltage signal based upon the phase signal from the switching node; and a summation circuit configured to generate the feedback voltage signal indicative of the output voltage based upon a summation of the compensated sampled output voltage signal and the rippled voltage signal.

9. The power converter according to claim 1, wherein the logic circuit is further configured to determine whether the on-time of the high side switch in a switching cycle exceeds a predetermined threshold period, and if so, to generate the switch control signal to cause the switching circuit to transition from the second operation mode to a third operation mode, during which the high side switch remains at constant on state and the low side switch remains at constant off state.

10. The power converter according to claim 1, further comprising a second mode control circuit configured to generate a second state indication signal by determining whether a sampled output voltage signal exceeds the reference voltage signal;

wherein the logic circuit is configured to generate the switch control signal further based upon the second state indication signal; and wherein the switch control signal is configured to cause the switching circuit to transition from the third operation mode to the second operation mode in response to a change of value of the second state indication signal indicating that the sampled output voltage signal rises across the reference voltage signal.

11. The power converter according to claim 2, wherein the switch control signal is configured so that, during the second operation mode, an end of off-time of the high side switch in each switching cycle is determined by a pre-set delay time after the end of on-time of the high side switch.

12. The power converter according to claim 2, wherein the switch control signal is configured so that, during the first operation mode, an end of on-time of the high side switch in each switching cycle is determined by a change of value of the second comparing signal indicating that the ramp voltage signal rises across the emulated output voltage signal.

13. The power converter according to claim 2, wherein the logic circuit further comprises:

a D flip-flop circuit configured to receive a D input signal, a clock input signal and a reset input signal, the D flip-flop circuit configured to generate a Q output signal, wherein the switch control signal is based upon the Q output signal;

a clock circuit configured to generate the clock input signal based upon the first comparing signal and the switch control signal; and a reset circuit configured to generate the reset input signal based upon the first comparing signal, the second comparing signal and the state indication signal.

14. The power converter according to claim 2, wherein the switching circuit further comprises:

an input node for coupling to the input voltage;

an output node for providing the output voltage, wherein the high side switch is electrically coupled between the input node and the switching node, and wherein the low side switch is electrically coupled between the switching node and a ground node; and an inductor electrically coupled between the switching node and the output node for providing an inductor current to the output node under control of the high side and low side switches in response to the switch control signal.

15. The power converter according to claim 3, wherein the switch control signal is configured so that, during the first operation mode, an end of off-time of the high side switch in each switching cycle is determined by a change of value of the first comparing signal indicating that the feedback voltage signal falls across the reference voltage signal.

16. The power converter according to claim 4, wherein:

the D input signal is a logic high voltage signal;

the clock input signal is configured to determine an end of off-time of the high side switch in each switching cycle of the high side switch; and the reset input signal is configured to determine an end of on-time of the high side switch in each switching cycle of the high side switch.

17. A controller for a switching circuit, wherein the switching circuit converts an input voltage into an output voltage, and comprises a high side switch, a low side switch, and a switching node between the high side switch and the low side switch, wherein the controller comprises:

a first comparator circuit configured to receive a reference voltage signal and a feedback voltage signal indicative of the output voltage, the first comparator circuit configured to generate a first comparing signal based upon a comparison of the feedback voltage signal and the reference voltage signal;

a second comparator circuit configured to receive a ramp voltage signal based upon an integration of a phase signal from the switching node, and an emulated output voltage signal based upon the phase signal, the second comparator circuit configured to generate a second comparing signal based upon a comparison of the ramp voltage signal and the emulated output voltage signal;

a mode control circuit configured to generate a state indication signal indicative of whether a ratio of the output voltage to the input voltage exceeds a predetermined threshold ratio; and a logic circuit configured to generate a switch control signal for controlling the switching circuit based upon the first comparing signal, the second comparing signal and the state indication signal, wherein the switch control signal is configured to cause the switching circuit to transition from a first operation mode to a second operation mode in response to a change of value of the state indication signal indicating that the ratio rises across the predetermined threshold ratio, and wherein the switch control signal is configured so that during the first operation mode, an end of on-time of the high side switch in each switching cycle of the high side switch is determined by the second comparing signal, and during the second operation mode, an end of on-time of the high side switch in each switching cycle is determined by the first comparing signal.

18. A method for controlling a switching circuit, wherein the switching circuit converts an input voltage into an output voltage, and comprises a high side switch, a low side switch, and a switching node between the high side switch and the low side switch, the method comprising the steps of:

generating a first comparing signal by comparing a feedback voltage signal indicative of the output voltage with a reference voltage signal;

generating a second comparing signal by comparing a ramp voltage signal based upon an integration of a phase signal from the switching node with an emulated output voltage signal based upon the phase signal;

generating a state indication signal indicative of whether a ratio of the output voltage to the input voltage exceeds a predetermined threshold ratio; and generating a switch control signal for controlling the switching circuit based upon the first comparing signal, the second comparing signal and the state indication signal, wherein the switch control signal is configured to cause the switching circuit to transition from a first operation mode to a second operation mode in response to a change of value of the state indication signal indicating that the ratio rises across the predetermined threshold ratio, and wherein the switch control signal is configured so that during the first operation mode, an end of on-time of the high side switch in each switching cycle of the high side switch is determined by the second comparing signal, and during the second operation mode, an end of on-time of the high side switch in each switching cycle is determined by the first comparing signal.

* * * * *